United States Patent
Ahn et al.

[15] 3,686,286
[45] Aug. 22, 1972

[54] ESTERIFICATION OF ORGANIC HALIDES WITH REDUCED OLEFIN PRODUCTION

[72] Inventors: Yong Kee Ahn, Wilkins Township, Allegheny County; Barrett L. Cupples, Plum Boro; Clarence R. Murphy, Allison Park, all of Pa.

[73] Assignee: Gulf Research & Development Company, Pittsburgh, Pa.

[22] Filed: March 23, 1970

[21] Appl. No.: 21,830

[52] U.S. Cl............260/493, 260/410, 260/410.9 R, 260/468 R, 260/471 R, 260/475 R, 260/484 P, 260/485 H, 260/485 L, 260/485 R, 260/491, 260/677 R, 260/683.15
[51] Int. Cl..............................................C07c 67/00
[58] Field of Search...260/491, 468, 493, 410, 410.9, 260/475, 485

[56] References Cited

UNITED STATES PATENTS

| | | |
|---|---|---|
| 2,861,098 | 11/1958 | DiSanza et al............260/493 |
| 2,296,823 | 9/1942 | Pollack et al..............260/493 |
| 1,459,971 | 6/1923 | Carter et al................260/493 |

*Primary Examiner*—Vivian Garner
*Attorney*—Meyer Neishloss, Deane E. Keith and Richard C. Gaffney

[57] ABSTRACT

An ester is prepared by reacting an organic acid, such as propionic acid, with an organic halide, such as n-octyl bromide, in the presence of water and an olefin having a similar configuration and the same number of carbon atoms as the organic portion of the organic halide.

9 Claims, 1 Drawing Figure

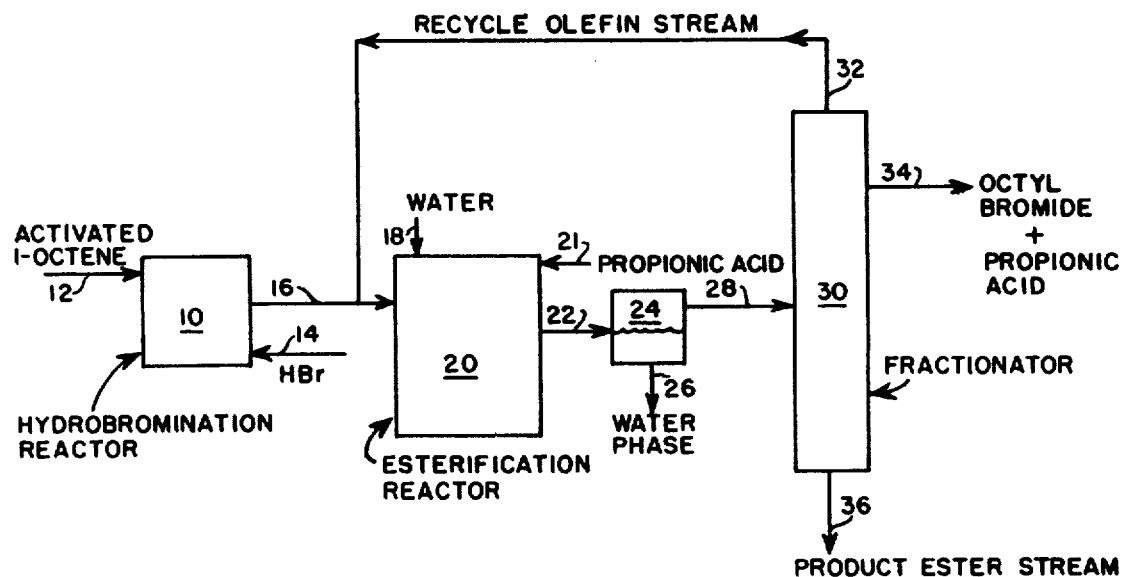

ESTERIFICATION OF ORGANIC HALIDES WITH REDUCED OLEFIN PRODUCTION

This invention relates to a process for preparing esters, and in particular for improving the selectivity to the formation of esters by the reaction of an organic halide with an organic acid in the presence of water.

The reaction of organic halides with organic acids to produce the corresponding ester and water is described in Canadian Pat. No. 765,833 to William L. Walsh. The reaction can occur over a relatively broad temperature range of up to about 400° C. For commercial purposes, it is desirable to operate in the higher temperature range of 170° C. and above in order to reduce reaction time and improve the space-time-yield of products from a given size reactor. Unfortunately, as the reaction temperature increases, side reactions become prevalent which reduce the selectivity of the reaction to the desired esters. One of these side reactions is the thermal breakdown of the organic halide, for example, octyl bromide, to form HBr and an olefin having the same number of carbon atoms as the organic portion of the halide. In an attempt to suppress decomposition of the organic halide, HBr was added to the charge stock to the esterification reactor, but the production of the unwanted olefin increased. Quite unexpectedly, the thermal cleavage of the organic halide was suppressed by recycling a sufficient amount of olefin produced so long as relatively large amounts of water were also present in the esterification reaction zone.

In accordance with the invention, an ester is prepared by a process which comprises:
reacting an organic acid selected from the group consisting of monobasic organic acids and polybasic organic acids;
with an organic halide selected from the group consisting of a primary alkyl halide, a secondary alkyl halide, a primary cyclic halide, a secondary cyclic halide and an olefin halide;
in the presence of water and an olefin having a similar configuration and the same number of carbon atoms as the organic portion of said organic halide and wherein the molar ratio of water to organic halide is from 25:1 to 150:1 and the molar ratio of the olefin to the organic halide is at least 0.1:1.

The first reactant that is employed herein includes monobasic organic acids as defined in said Canadian Pat. No. 765,833, such as saturated straight chain aliphatic monobasic organic acids, that is, carboxylic acids, having from two to 30 carbon atoms, preferably from two to 22 carbon atoms; saturated branched chain aliphatic monobasic acids having from two to 30 carbon atoms, preferably from two to 22 carbon atoms, aromatic monobasic acids, saturated cyclic monobasic acids and straight and branched monobasic olefinic acids having from three to 22 carbon atoms, preferably from six to 22 carbon atoms. The first reactant can also include dibasic organic acids such as aliphatic straight and branched chain dibasic acids having from four to 22 carbon atoms, preferably from four to 18 carbon atoms, straight and branched chain olefinic dibasic acids having from four to 22 carbon atoms, preferably from four to 18 carbon atoms, cyclic dibasic acids having from five to 22 carbon atoms, preferably from five to 18 carbon atoms, and aromatic dibasic acids having from eight to 22 carbon atoms, preferably from eight to 18 carbon atoms; and polybasic acids having from four to 22 carbon atoms, preferably from four to 18 carbon atoms.

To react with the monobasic and dibasic acids defined above to produce the desired ester in accordance with the process defined and claimed herein, there must be employed an organic halide selected from the group consisting of primary straight and branched chain alkyl halides having from two to 30 carbon atoms, preferably from two to 22 carbon atoms; secondary straight and branched chain alkyl halides having from two to 30 carbon atoms, preferably from two to 22 carbon atoms; primary cyclic halides having from four to 22 carbon atoms, preferably from four to 12 carbon atom; secondary cyclic halides having from three to 22 carbon atoms, preferably from three to 12 carbon atoms; primary straight and branched chain olefinic halides having from three to 22 carbon atoms, preferably from six to 22 carbon atoms; and secondary straight and branched chain olefinic halides having from three to 22 carbon atoms, preferably from six to 22 carbon atoms. Specific examples of each of the monobasic organic acids and organic halides that can be used herein are set forth in said Canadian Pat. No. 765,833, referred to above, including organic halides having only one carbon atom which are not suitable for use in the process of this invention since they obviously cannot form olefinic by-products. Examples of dibasic acids that can be employed include specific examples of aliphatic straight and branched dibasic acids, such as succinic acid, glutaric acid, adipic acid, pilmelic acid, azelaic acid, sebacic acid, suberic acid, methylsuccinic acid, dimethylsuccinic acid, methyladipic acid, etc.; specific examples of straight and branched olefinic dibasic acids, such as maleic acid, fumaric acid, methylmaleic acid, dimethylmaleic acid, ethylmaleic acid, methylfumaric acid, dimethylfumaric acid, chloromaleic acid, dichloromaleic acid, glutaconic acid, etc.; specific examples of cyclic dibasic acids, such as cyclohexane dicarboxylic acid, cyclopentane dicarboxylic acid, cyclododecane dicarboxylic acid, etc.; specific examples of aromatic dibasic acids, such as orthophthalic acid, nitrophthalic acid, tetrachlorophthalic acid, etc.; and specific examples of polybasic acids, such as tricarballylic acid, aconitic acid, citric acid, etc. Of the organic halides defined above, it is preferred to employ alkyl halides, particularly primary alkyl halides having from four to 12 carbon atoms. Of the alkyl halides, alkyl chlorides and alkyl bromides are preferred. Although it is preferred to employ the organic acids and the organic halides in approximately stoichiometric amounts, the molar proportions thereof can vary from about 10:1 to about 1:10.

The organic halide, such as 1-bromooctane, and the organic acid, such as propionic acid, are brought together and react to form the desired ester plus hydrogen halide, for example, hydrogen bromide, in accordance with the equation below:

where R is octyl and R' is ethyl. The organic halide can, however, thermally decompose to form an olefin and a hydrogen halide in accordance with the equation below:

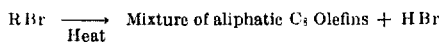

In accordance with the invention, it is desirable to perform the reaction in the presence of an olefin having the same number of carbon atoms as the organic portion of said organic halide. In addition, said olefin should have a similar configuration to the organic portion of said organic halide. For example, aliphatic olefins should be employed when aliphatic organic halides are used as the charge stock. As a specific example, if octyl bromide is the organic halide employed, a suitable olefin would be 1-octene. Other monoolefins would be similarly derived from the other organic halides having at least two carbon atoms defined in the above said Canadian Pat. No. 765,833. Preferably the olefins are those produced during the esterification reaction and are recycled to form a portion of the charge stock.

The molar ratio of the olefin to the organic halide in the charge stock is at least 0.1:1 and can be as high as 1:1. Preferably the molar ratio of olefin to organic halide is from 0.15:1 to 0.4:1.

The amount of ester produced and the inhibition of olefin are considerably enhanced by carrying out the reaction in the presence of water. In addition, a considerable amount of desirable alcohol product (i.e., 30 to 40 percent based on the total product) is made when the water is added. The molar ratio of water to the organic halide reactant defined above can be from about 25:1 to about 150:1 and is preferably from about 40:1 to about 80:1.

In carrying out the reaction with the reactants defined above, the olefin and the water can be brought together in any convenient manner. The temperature can be from about 170° C. to about 250° C., but preferably is about 180° C. to about 210° C. Pressures are not critical and any pressure is suitable, but in order to maintain water in the reaction zone a pressure of at least about 100 pounds per square inch gauge should be used. Generally the reaction pressure is between 200 and 400 psig. The reaction time is similarly not critical and is dependent upon the other variables involved and on the amount of conversion desired. In general, the reaction time is about one minute to about four hours and is usually from about 15 minutes to about one hour.

The figure attaches is a preferred method of operation of the process of this invention.

Referring to the figure, an alpha-olefin having preferably from four to 10 carbon atoms per molecule is passed through line 12 into hydrobromination reactor 10. The alpha-olefin, exemplified by 1-octene, is preferably prepared by the telomerization of a low molecular weight olefin, such as ethylene, under telomerization conditions in the presence of a catalyst such as a Group IIIA metal alkyl such as aluminum triethyl. Hydrogen bromide enters reactor 10 through line 14 and reaction is promoted by any suitable means to utilize substantially all of the HBr and olefin and to produce the desired primary alkyl bromides. Preferably, the alpha-olefin is preactivated with air under appropriate conditions so that no extraneously added catalyst is required to be inserted into reactor 10 to promote the desired anti-Markownikoff addition reaction.

The product from reactor 10 (without separation) is removed through line 16 and passed into the esterification reactor 20. Water enters esterification reactor 20 through line 18 and the organic acid, for example, propionic acid, required for esterification enters reactor 20 through line 21.

The product, consisting of the desired ester and alcohol, unreacted alkyl bromide, olefin, either and other side reaction products, leaves reactor 20 through line 22 and enters phase separator 24. The lower water phase, consisting mostly of water, HBr and propionic acid, is removed through line 26 and sent for further separation. An upper organic phase comprising the ester and alcohol, propionic acid, olefins, etc., is removed through line 28 and enters distillation tower 30. Unreacted olefins are removed from tower 30 (or a series of towers if desired) through line 32 and are recycled to reactor 20 through line 16. Unreacted octyl bromide (1-bromooctane) and propionic acid together with some product octyl alcohol from the esterification reaction can be removed as a side stream from tower 30 through line 34. The desired ester product and ether can be removed from tower 30 through line 36 and sent for further separation.

The process defined herein can be further illustrated by means of the following specific examples. The following procedure was employed in all runs unless otherwise stipulated. Into a continuous stirred tank reactor was introduced a mixture of 1-bromooctane, propionic acid and a mixture of aliphatic olefins having eight carbon atoms together with water at a temperature from 180° C. to 200° C. at a pressure of from 200 to 300 psig (slightly more than the vapor pressure of water at the given reaction temperature. The product was continuously removed to a phase separator and the aqueous and organic layers were separately treated for recovery of their components. Unreacted olefins were recovered primarily from the upper organic layer and at least a portion were recycled. The 1-bromooctane used as the charge stock to the esterification reactor was the entire reaction product obtained by the hydrobromination of air activated 1-octene wherein the molar ratio of HBr to 1-octene was substantially 1:1. This product had the composition as shown In Table I below.

TABLE I

| | Mole Percent |
|---|---|
| Unreacted Octenes | 2.5 |
| 1-Bromooctane | 94.9 |
| 2-Bromooctane | 2.6 |
| | 100.0 |

The 1-octene was obtained by the telomerization of ethylene.

EXAMPLE 1

The 1-bromooctane as shown in Table I was added to the continuous esterification reactor together with water and propionic acid in a molar ratio of water to propionic acid to 1-bromooctane of 65:4:1. Reaction temperature was 200° C. and the reaction pressure was 250 psig. After a reaction time of 20 minutes, the total conversion of 1-bromooctane was 79.7 mole percent and the conversion of 1-bromooctane to olefin was 6.2 mole percent. The selectivity to the formation of olefin was 7.8 percent which was calculated by dividing the conversion of 1-bromooctane to olefin by the total conversion of 1-bromooctane.

EXAMPLE 2

Example 1 was repeated except the molar ratio of water to propionic acid to 1-bromooctane was 45:2:1. The conversion and selectivity of 1-bromooctane to olefin was 5.8 and 8.2 percent respectively.

EXAMPLE 3

Example 1 was repeated except the molar ratio of water to propionic acid to 1-bromooctane was 130:8:1. The conversion and selectivity of 1-bromooctane to olefin was 4.2 and 4.7 percent respectively.

A comparison of Examples 1–3 shows that the selectivity of the process for the conversion of 1-bromooctane to olefin decreases with increasing amounts of water. This effect is further shown by Example 4 below.

EXAMPLE 4

Example 1 was repeated except the reaction temperature was 190° C. and the molar ratio of water to propionic acid to 1-bromooctane was 65:6:1 and, in addition, 5 weight percent HBr was added to the feed water. The conversion and selectivity of 1-bromooctane to olefin was 7.8 and 11.0 respectively.

Example 4 shows that by the addition of HBr to the feed water, increased amounts of olefin are produced. Apparently sufficient water is required to maintain the HBr concentration at a very low level, less than 5 weight percent, in order to retard the formation of olefin. Increased molar ratios of water to organic halide tend to have this effect and are thus preferred in the process of this reaction in order to reduce the amount of olefin produced.

EXAMPLE 5

Example 4 was repeated except the feed water did not contain any HBr initially. HBr is, of course, produced during the reaction. The conversion and selectivity of 1-bromooctane to olefin was 2.3 and 3.2 percent respectively, showing when compared with Example 4 that the function of the water is apparently to maintain a low concentration of HBr in the reactor.

A series of runs was made wherein an increasing concentration of olefin was employed in the charge stock. All of the runs were the same as Example 1 above except for an increasing concentration of recycled olefins in the feed. The results of these runs are shown in Table II below.

TABLE II

REACTION OF 1-BROMOOCTANE WITH PROPIONIC ACID AT 250 PSIG; 200°C.; FOR 20 MINUTES USING A MOLAR RATIO OF WATER TO PROPIONIC ACID TO 1-BROMOOCTANE OF 65:4:1

| Example No. | Olefins in feed Mole % | Molar Ratio Olefins to 1-Bromooctane | Conversion of 1-Bromooctane to Olefin Mole % | Selectivity for Olefin Formation from 1-Bromooctane |
|---|---|---|---|---|
| 1 | 2.5 | 0.026 | 6.2 | 7.8 |
| 6 | 4.1 | 0.047 | 5.5 | 7.1 |
| 7 | 7.4 | 0.085 | 3.3 | 4.4 |
| 8 | 9.0 | 0.105 | 3.1 | 4.1 |
| 9 | 10.6 | 0.130 | 1.1 | 1.4 |
| 10 | 13.8 | 0.167 | 0.9 | 1.0 |
| 11 | 19.8 | 0.261 | 0.5 | 0.7 |

Referring to Table II above, it can be seen that the addition of increasing amounts of olefin reduces the conversion and selectivity of the alkyl bromide to olefin.

Resort may be had to such variations and modifications as fall within the spirit of the invention and the scope of the appended claims.

We claim:

1. A process for the preparation of an ester which comprises:
   reacting an aliphatic monobasic hydrocarbon carboxylic organic acid having from two to 22 carbon atoms;
   with an organic halide selected from the group consisting of a primary alkyl halide and a secondary alkyl halide;
   in the presence of water and hydrocarbon olefin having a similar configuration and the same number of carbon atoms as the organic portion of said organic halide and wherein the molar ratio of water to organic halide is from 25:1 to 150:1 and the molar ratio of the olefin to the organic halide is at least 0.1:1 and at a reaction temperature of 170° C. to 250° C.

2. A process according to claim 1 wherein the organic halide is a primary alkyl halide.

3. A process according to claim 2 wherein the primary alkyl halide is a primary alkyl bromide.

4. A process according to claim 3 wherein the organic acid is propionic acid.

5. A process for the preparation of an ester which comprises:
   reacting an aliphatic monobasic hydrocarbon carboxylic organic acid having from two to 22 carbon atoms;
   with an organic halide selected from the group consisting of a primary alkyl halide and a secondary alkyl halide;
   in the presence of water wherein the molar ratio of water to organic halide is from 25:1 to 150:1 and at a reaction temperature of 170° C. to 250° C. to form a reaction product;
   separating a hydrocarbon olefin having a configuration similar to and having the same number of carbon atoms as the organic portion of said organic halide from said reaction product and recycling at least a portion of said olefin to said reaction zone so that the olefin to organic halide molar ratio is at least 0.1:1.

6. A process according to claim 5 wherein said organic halide is the total reaction product from the reaction of an alpha-olefin and HBr wherein the molar ratio of the alpha-olefin to HBr is substantially 1:1.

7. A process according to claim 6 wherein the alpha-olefin is prepared from the telomerization of ethylene.

8. A process according to claim 5 wherein the organic acid is propionic acid.

9. A process according to claim 8 wherein the organic halide is a primary alkyl bromide.

* * * * *